(12) United States Patent
Kimura et al.

(10) Patent No.: US 8,632,122 B2
(45) Date of Patent: Jan. 21, 2014

(54) CONSTRUCTION MACHINE

(75) Inventors: Shougo Kimura, Ritto (JP); Hajime Ishii, Higashiomi (JP); Tomoyuki Tanaka, Yasu (JP); Hiroshi Tabeta, Konan (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 7 days.

(21) Appl. No.: 13/386,247

(22) PCT Filed: Sep. 21, 2010

(86) PCT No.: PCT/JP2010/066303
§ 371 (c)(1),
(2), (4) Date: Jan. 20, 2012

(87) PCT Pub. No.: WO2011/061993
PCT Pub. Date: May 26, 2011

(65) Prior Publication Data
US 2012/0134768 A1     May 31, 2012

(30) Foreign Application Priority Data
Nov. 20, 2009   (JP) .................................. 2009-264886

(51) Int. Cl.
*B62D 33/06*     (2006.01)
*B62D 33/067*    (2006.01)

(52) U.S. Cl.
USPC ................................ 296/190.05; 296/190.01

(58) Field of Classification Search
USPC ............. 296/190.01, 190.05, 190.07, 190.04, 296/190.08; 180/89.12–89.14
See application file for complete search history.

(56) References Cited

U.S. PATENT DOCUMENTS

| 7,388,114 | B2* | 6/2008 | Shirakawa et al. | 568/615 |
| 7,503,419 | B2* | 3/2009 | Miyake | 180/327 |
| 7,770,963 | B2* | 8/2010 | Tsukamoto et al. | 296/190.08 |
| 7,887,124 | B2* | 2/2011 | Tsukamoto | 296/190.08 |
| 8,029,044 | B2* | 10/2011 | Akahane et al. | 296/190.11 |
| 8,267,467 | B2* | 9/2012 | Takaoka et al. | 296/190.08 |
| 2005/0066556 | A1 | 3/2005 | Fujii | |
| 2007/0175684 | A1 | 8/2007 | Fujii | |
| 2008/0265624 | A1* | 10/2008 | Takano et al. | 296/190.01 |
| 2010/0102594 | A1* | 4/2010 | Kimura et al. | 296/190.01 |
| 2012/0134768 | A1* | 5/2012 | Kimura et al. | 414/687 |

FOREIGN PATENT DOCUMENTS

| JP | 3-96283 | 10/1991 |
| JP | 2005-105700 | 4/2005 |

(Continued)

*Primary Examiner* — Glenn Dayoan
*Assistant Examiner* — Gregory Blankenship
(74) *Attorney, Agent, or Firm* — Mattingly & Malur, PC (57) ABSTRACT

A floor member is formed by a seat support platform on a rear side and a footrest area located on a front side of the seat support platform, and a cab box is formed by a front panel, a rear panel, a left front side panel, a left rear side panel, a right side panel, and a top panel. A right reinforcing panel is provided at a right side position of the floor member and rises upwardly of the footrest area. The right side panel of the cab box corresponding to this right reinforcing panel is provided with a notched portion for avoiding interference with the right reinforcing panel. Accordingly, since the strength at the right side position of the floor member can be enhanced by the right reinforcing panel, it is possible to prevent deformation such as torsion and distortion when the floor member is tilted up.

5 Claims, 11 Drawing Sheets

(56) References Cited

FOREIGN PATENT DOCUMENTS

| | | |
|---|---|---|
| JP | 2005-231562 | 9/2005 |
| JP | 2005-255109 | 9/2005 |
| JP | 2005-350911 | 12/2005 |
| JP | 2007-056626 | 3/2007 |
| JP | 2008-013033 | 1/2008 |

* cited by examiner

CONSTRUCTION MACHINE

TECHNICAL FIELD

The present invention relates to a construction machine such as a hydraulic excavator having a cab in which an operator rides.

BACKGROUND ART

Generally, among hydraulic excavators as construction machines, there are small-sized hydraulic excavators called mini excavators which are suitable for operation in narrow work sites. The upper revolving structure of this small-sized hydraulic excavator is formed to be small so as to be able to revolve even in narrow places.

Here, the small size hydraulic excavator is constituted by an automotive lower traveling structure, an upper revolving structure which is swingably mounted on the lower traveling structure and has a cab provided on a revolving frame constituting a supporting structure, and a working mechanism liftably provided on a front side in the front and rear directions of the upper revolving structure.

The cab of the hydraulic excavator is constituted by a floor member which has on a rear side thereof an operator's seat where an operator is seated and whose front side serves as the operator's footrest area, as well as a cab box which is installed on the floor member and defines an operator's room therein. Further, the cab box is formed by a front side, a rear side, a left side, a right side, and a top side, and an entrance way is provided on the left side for the entrance and exit of the operator to and from the operator's room.

Meanwhile, with the small-sized hydraulic excavator, since the installation space for equipment is limited, the equipment is installed by making use of the space below the floor member. For this reason, in the small-sized hydraulic excavator, the cab is arranged to be supported on the revolving frame so as to be tiltable up and down in a vertical direction by using as a fulcrum the front side position of the floor member so that inspection and maintenance can be provided for the equipment disposed below the floor member (Patent Document 1: Japanese Patent Laid-Open No. 2005-350911 A).

Further, in addition to the operator's seat, control levers, switches, and so on, electrical components and the like for controlling various electrical equipment are provided within the operator's room surrounded by the floor member and the cab box (Patent Document 2: Japanese Patent Laid-Open No. 2005-255109 A).

SUMMARY OF THE INVENTION

With the hydraulic excavator according to the aforementioned Patent Document 1, the floor member is tiltably mounted with respect to the revolving frame. Depending on the work, however, there are cases where the floor member is tilted up with the cab box dismounted. In this case, since the floor member as a single unit is mainly constituted by a horizontally extending plate, the floor member can possibly undergo deformation such as torsion and distortion when it is tilted up.

Accordingly, the floor member according to the conventional art must be provided with structural members for reinforcement (pipes, angles, etc.) at plural locations so as to be able to prevent deformation at the time of the tilt up. Hence, there are problems in that the weight becomes high and that the manufacturing cost unfavorably increases, by the increase of the number of component parts.

With the hydraulic excavator according to the Patent Document 2, there are problems in that in the case where electrical components and the like are to be installed, since the space within the operator's room is narrow, they must be installed at positions where they cause hindrances to the maintenance operation of the other equipment or must be installed at positions where the accommodating space is sacrificed.

In view of the above-discussed problems with the conventional art, it is an object of the present invention to provide a construction machine in which the strength of the floor member as a single unit can be enhanced by a small number of parts, and which makes it possible to attain light weight and low cost of the floor member by omitting the structural members for reinforcement.

(1) A construction machine in accordance with the invention comprising: an automotive lower traveling structure, an upper revolving structure which is swingably mounted on the lower traveling structure and has a cab provided on a revolving frame constituting a supporting structure, and a working mechanism liftably provided on a front side in front and rear directions of the upper revolving structure, wherein the cab is formed by a floor member which has an operator's seat where an operator is to be seated at a rear side thereof and whose front side serves as an operator's footrest area and by a cab box which is installed on the floor member, is formed by a front side, a rear side, a left side, a right side, and a top side to define an operator's room therein, and has an entrance way on the left side, the cab being supported on the revolving frame so as to be tiltable in a vertical direction by using the front side as a fulcrum.

Further, to overcome the above-described problems, a characteristic feature of a construction adopted in the present invention lies in a construction in which a right reinforcing panel is provided at a right side position in left and right directions of the floor member in such a manner as to rise upwardly of the footrest area so as to reinforce the right side position, and that a right side panel located on the right side of the cab box is provided with a notched portion for avoiding interference with the right side panel at a position corresponding to the right reinforcing panel.

With this arrangement, the floor member can be formed three-dimensionally by plates extending in a plurality of directions by providing the right reinforcing panel, thereby making it possible to reinforce its right side position. Consequently, even if the floor member is tilted up in a state of the cab box being dismounted, it is possible to suppress the floor member from undergoing deformation such as torsion and distortion at this time.

As a result, since the floor member reinforced by the right reinforcing panel makes it possible to reduce the number of locations where structural members for reinforcement are to be mounted, it is possible to reduce the number of component parts making up the floor member, thereby making it possible to attain low weight and low cost.

Meanwhile, in the conventional art, electrical components provided in the cab box are connected through cables to electrical components and electrical equipment provided on the floor member. For this reason, in cases where the cab box is dismounted from the floor member, the cables must also be removed, causing a hindrance to the maintenance operation.

As such, in the present invention, since the right reinforcing panel is provided at the right side position of the floor member, when the cab box is dismounted from the floor member to perform maintenance operation or the like, only the cab box can be dismounted in a state in which the right reinforcing panel is remained on the floor member. As a result, the electrical components and the like, which are conventionally provided on the cab box side, can be mounted by making use of the right reinforcing panel, so that electrical components and the like can be disposed even in the narrow operator's room. Moreover, during the maintenance operation, the cab box can be simply dismounted without heeding the cables and the like, so that the operational efficiency can be improved.

(2) According to the present invention, when the cab box is mounted on the floor member, the notched portion of the right side panel of the cab box and the right reinforcing panel of the floor member are arranged to be disposed on an identical plane.

With this arrangement, the right reinforcing panel of the floor member and the right side panel of the cab box can be disposed on an identical plane so that they do not overlap with each other. In consequence, it is possible to suppress the right side from becoming thick and thereby enlarge the operator's room, and the attractive feature in external appearance can be improved.

(3) In this case, according to the present invention, a construction is adopted in which the right side panel of the cab box is provided between a right front pillar and a right rear pillar, and the right reinforcing panel of the floor member is provided in such a manner as to extend in the front and rear directions between the right front pillar and the right rear pillar.

With this arrangement, the right reinforcing panel of the floor member can be provided substantially over the entire length in the front and rear directions of the floor member between the right front pillar and the right rear pillar of the cab box. Consequently, it is possible to further enhance the strength of the floor member.

(4) According to the present invention, a construction is adopted in which a seal mounting portion located on an upper end side of the right reinforcing panel of the floor member is provided with a seal member for preventing ingress of rainwater, and the right side panel of the cab box is provided with a seal abutting portion against which the seal member abuts at a position of the notched portion.

By this constitution, when the cab box is mounted to the floor member, the seal member provided on the seal mounting portion of the right reinforcing panel of the floor member can be elastically brought into close contact with the seal abutting portion provided on the notched portion of the cab box. In consequence, it is possible to eliminate a clearance between the right reinforcing panel of the floor member and the notched portion of the cab box to thereby prevent the ingress of rainwater, dust, and the like, so that the working environment within the operator's room can be improved.

(5) According to the present invention, a construction is provided in which an electrical component is mounted on the right reinforcing panel of the floor member by being located on an inner side thereof for constituting an interior of the operator's room.

By this arrangement, since the electrical component can be provided on the right reinforcing panel of the floor member, the place where the electrical component has hitherto been mounted can be secured as an installation space or an accommodation space for other objects.

MODE FOR CARRYING OUT THE INVENTION

Hereinafter, a construction machine according to an embodiment of the present invention will be explained in greater detail with reference to FIG. 1 to FIG. 11 of the accompanying drawings, by citing as an example a hydraulic excavator of cab specifications.

Figure 1:
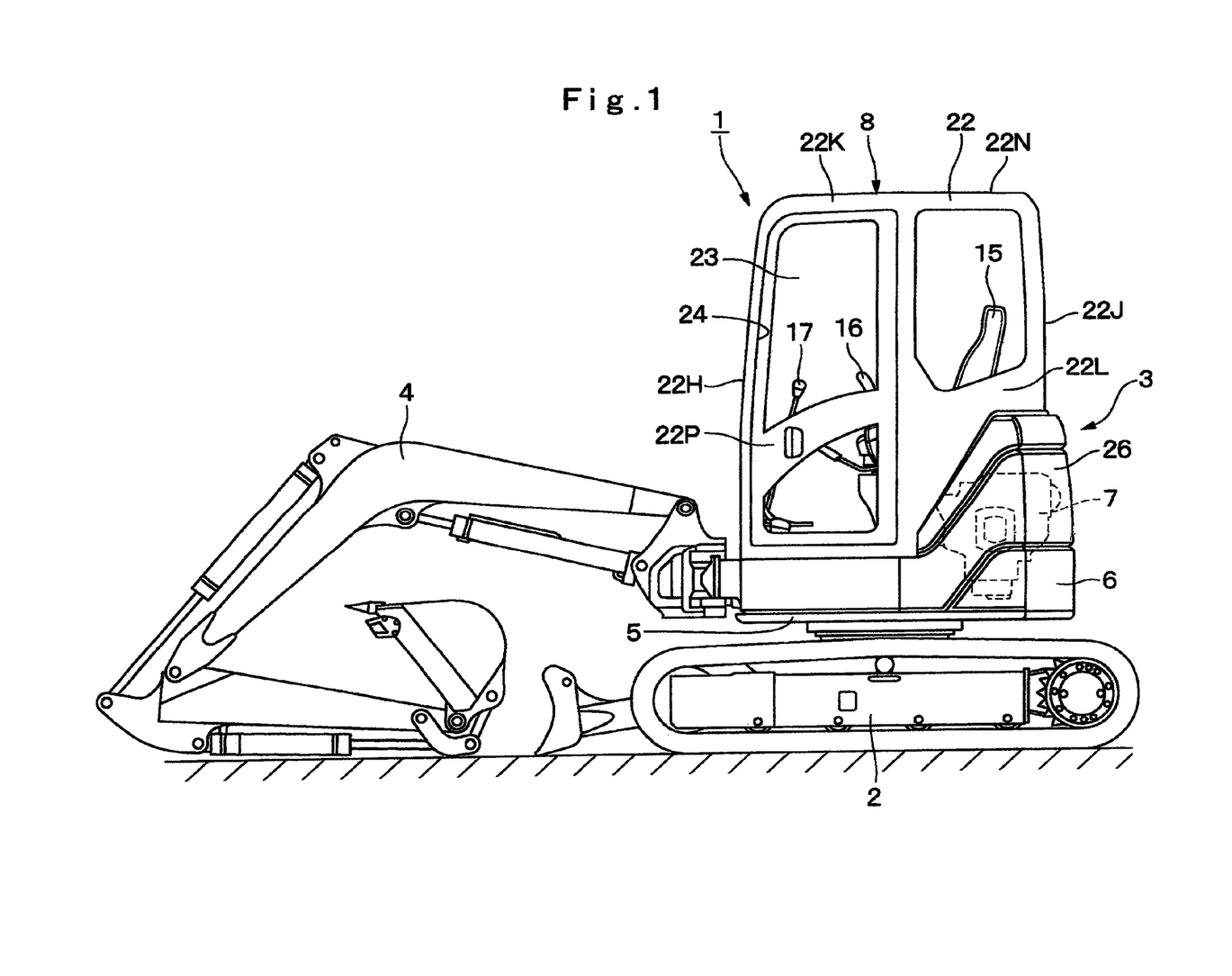
FIG. 1 is a front view showing a small-sized hydraulic excavator which is applied in an embodiment of the present invention.
Figure 2:
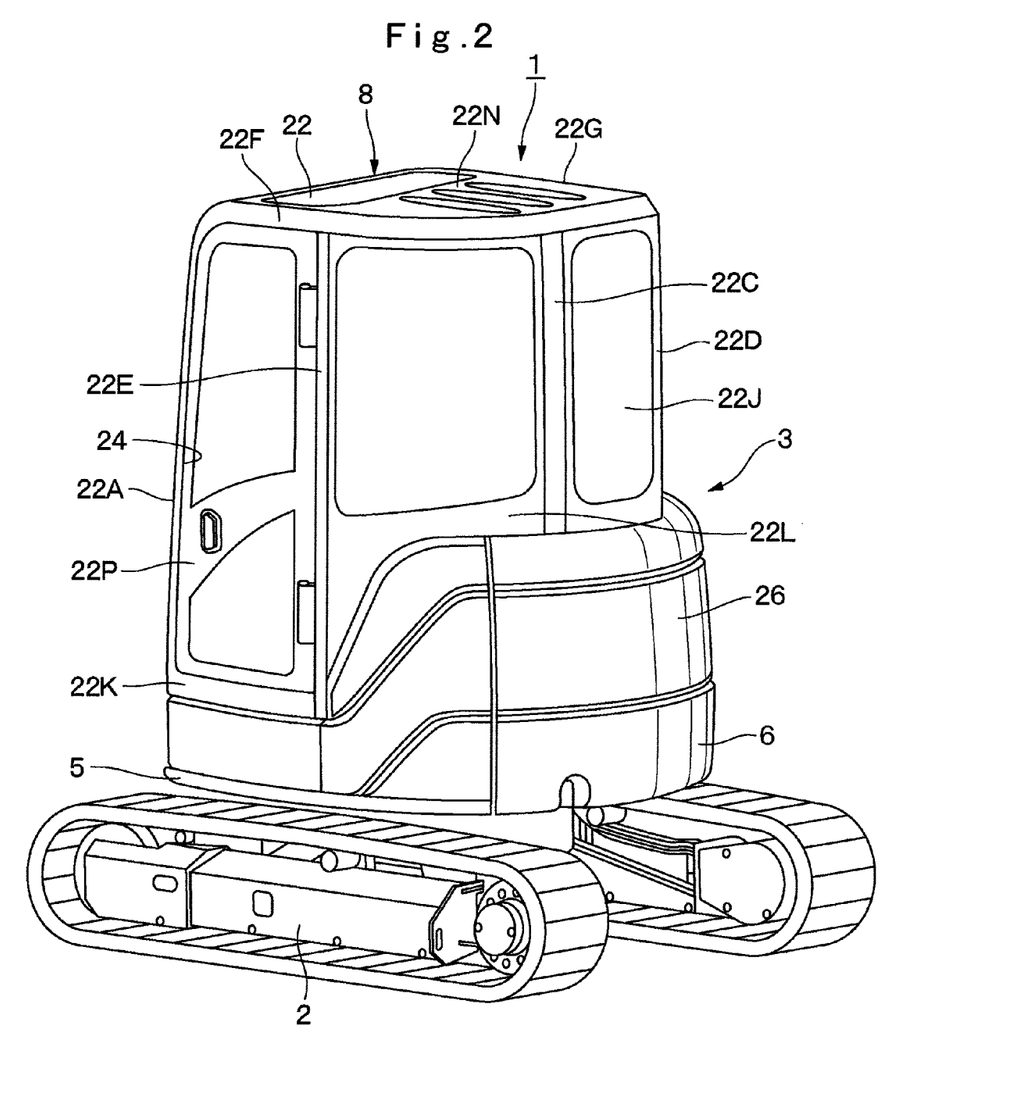
FIG. 2 is an external perspective view, taken from a left rear upper side, of the hydraulic excavator with a working mechanism omitted.
Figure 3:
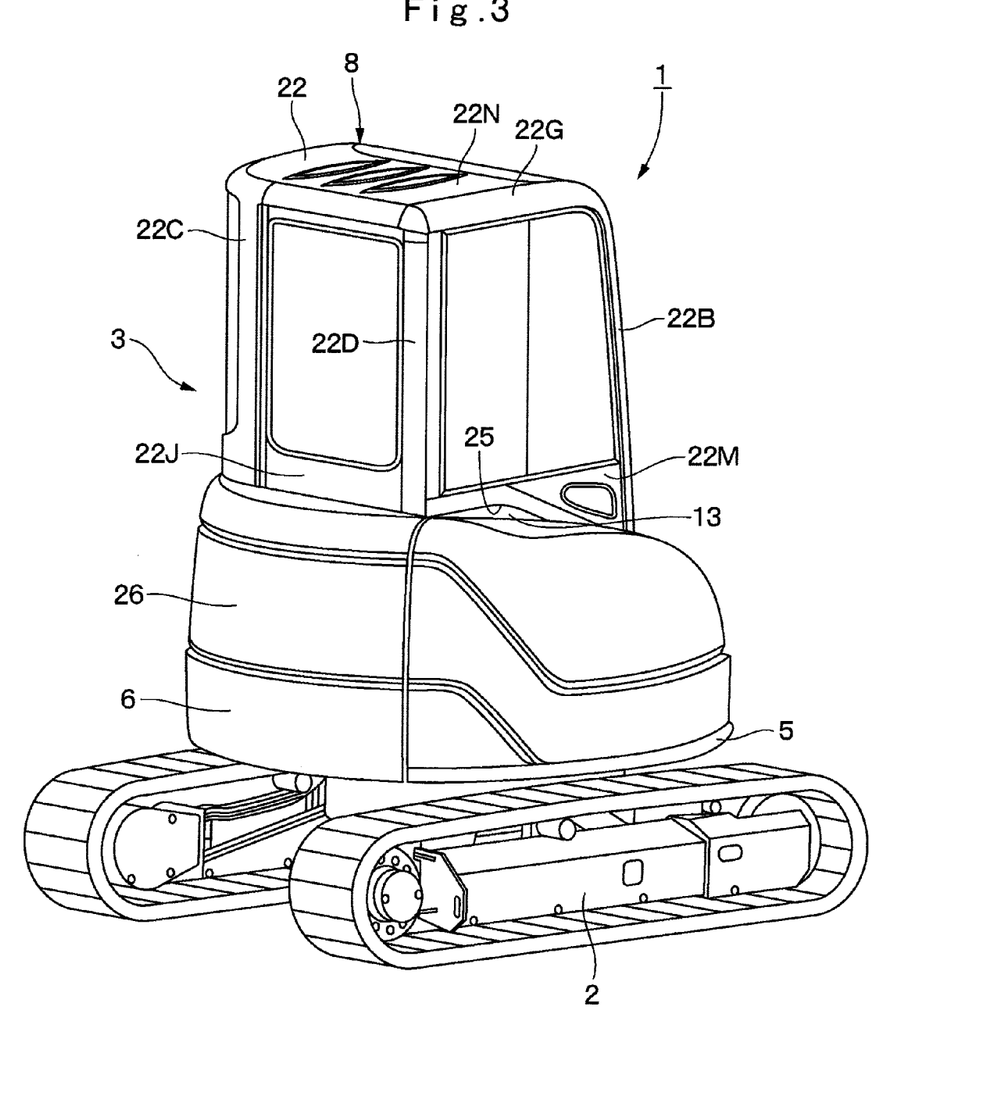
FIG. 3 is an external perspective view, taken from a right rear upper side, of a part of the hydraulic excavator with the working mechanism omitted.

In FIGS. 1 to 3, designated at 1 is a hydraulic excavator of cab specifications as a construction machine which is used in this embodiment, and the hydraulic excavator 1 is a small-sized hydraulic excavator so-called a mini excavator suitable for operation in narrow work sites. This hydraulic excavator 1 is largely constituted by an automotive lower traveling structure 2, an upper revolving structure 3 which is swingably mounted on the lower traveling structure 2, and a working mechanism 4 provided on the front side in the front and rear directions of the upper revolving structure 3 to perform the operation of such as excavating earth and sand.

The upper revolving structure 3 is constituted by a revolving frame 5 which is formed as a supporting structure, as well as an engine 7, a cab 8, and the like which are provided on the revolving frame 5 and will be described hereinafter. The working mechanism 4 is mounted swingably and liftably on the front side of the revolving frame 5.

Indicated at 6 is a counterweight which is mounted on a rear portion of the revolving frame 5. This counterweight 6 is for keeping a weight balance with the working mechanism 4. This counterweight 6 is formed in such a manner as to be curved in a circular arc shape so as to cover the below-described engine 7 from behind. Further, the counterweight 6 constitutes a supporting structural member for mounting a floor fixing portion 11 of a below-described floor member 9 to the revolving frame 5 side.

Indicated at 7 is the engine (illustrated by dotted lines in FIG. 1) mounted on the rear side of the revolving frame 5 by being positioned in front of the counterweight 6. The engine 7 is disposed in a transversely mounted state in which it extends in the left and right directions. The engine 7 rotatively drives a hydraulic pump.

Figure 11:
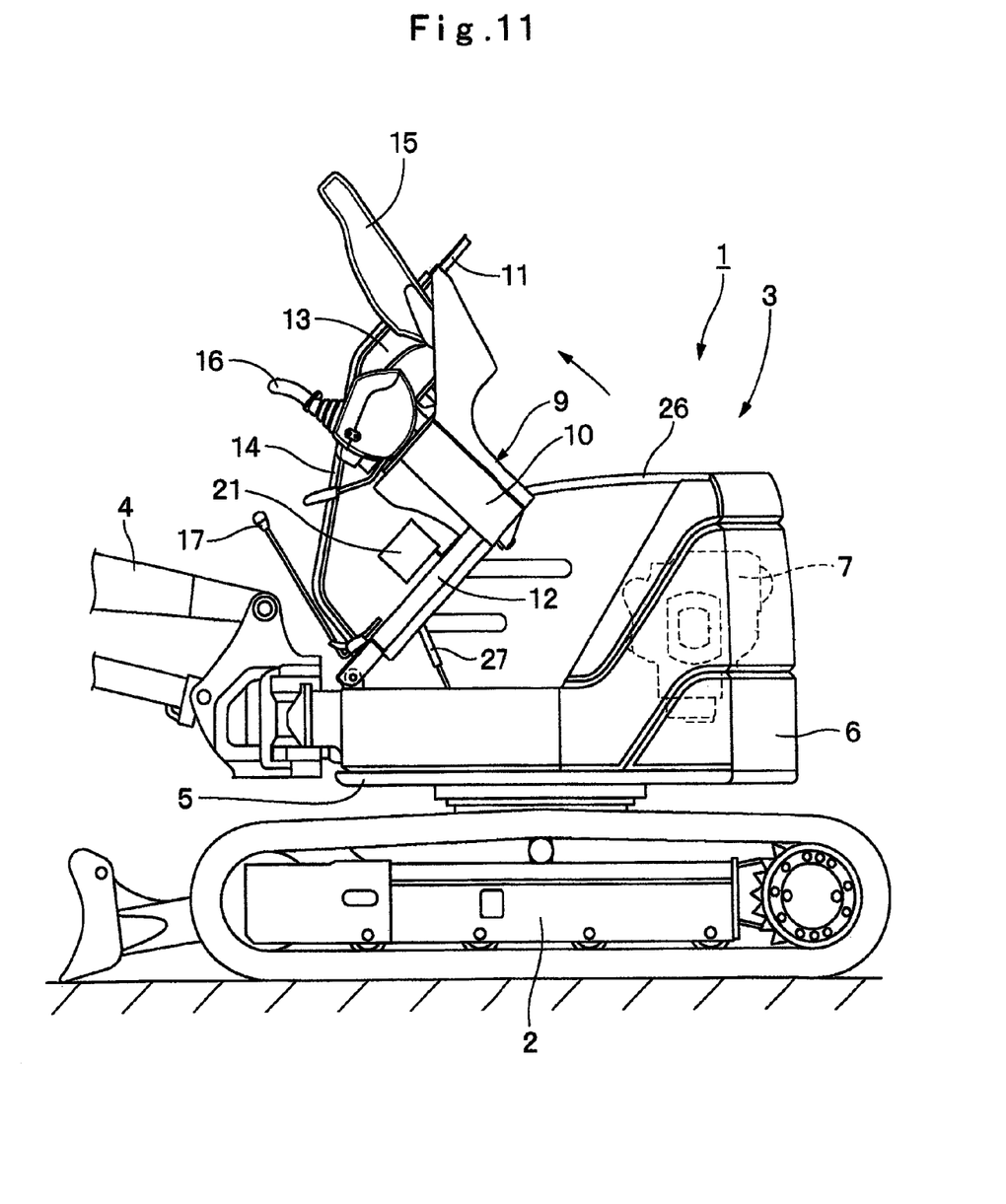
FIG. 11 is a front view showing a state in which only the floor member is tilted up with the cab box dismounted.

Designated at 8 is the cab provided on the revolving frame 5. This cab 8 defines a below-described operator's room 23 in which the operator rides, and is formed as a box-like body extending in the vertical direction. As shown in FIG. 11, the cab 8 is arranged to be supported on the revolving frame 5 so as to be tiltable up and down in the vertical direction by using the front side as a fulcrum. Here, the cab 8 is constituted by the floor member 9, a right reinforcing panel 13, an operator's seat 15, an electrical component accommodating case 21, a cab box 22, a notched portion 25, and the like which will be described hereinafter.

Figure 6:
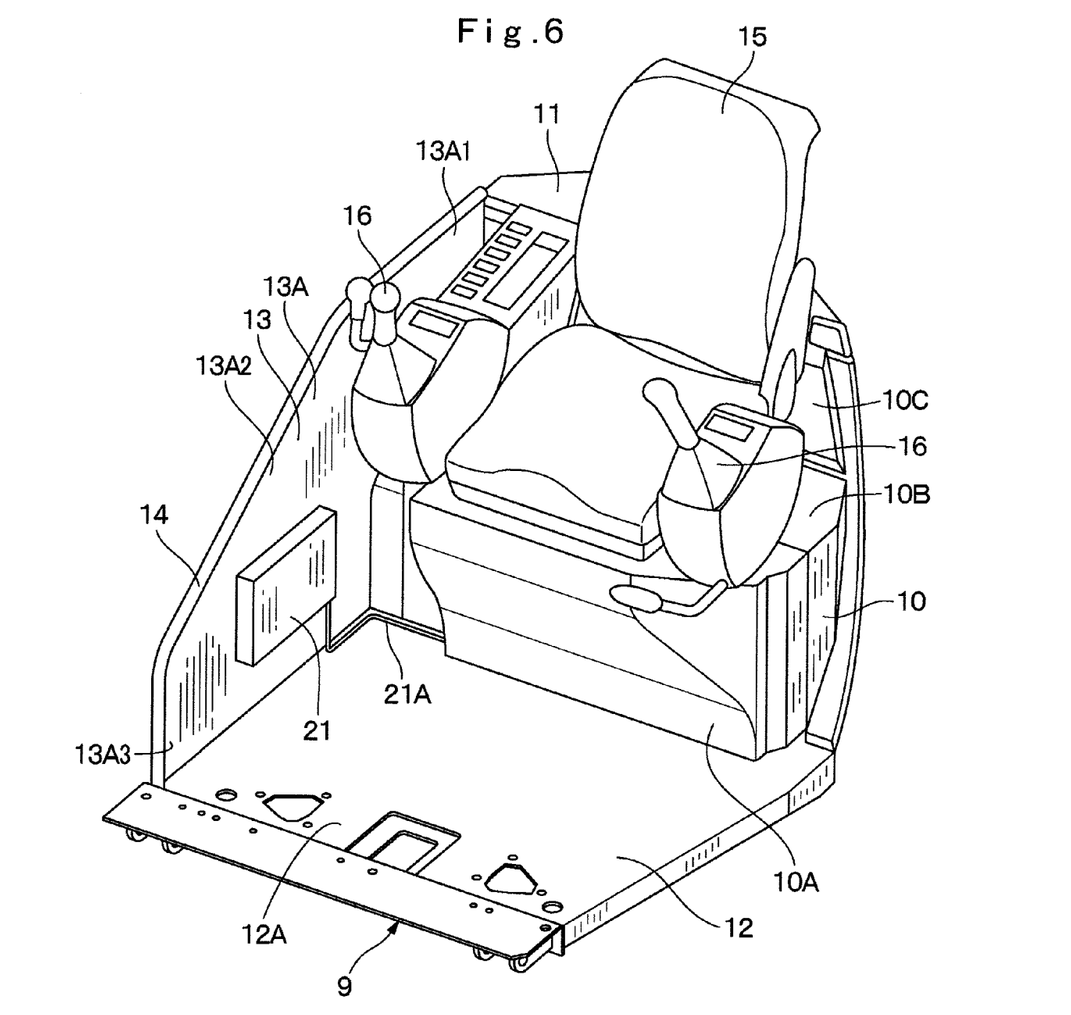
FIG. 6 is an external perspective view, taken from the left front upper side, of a state in which the operator's seat, the control levers, the electrical component accommodating case, and the like are assembled to the floor member, and the air conditioning duct is removed.
Figure 7:
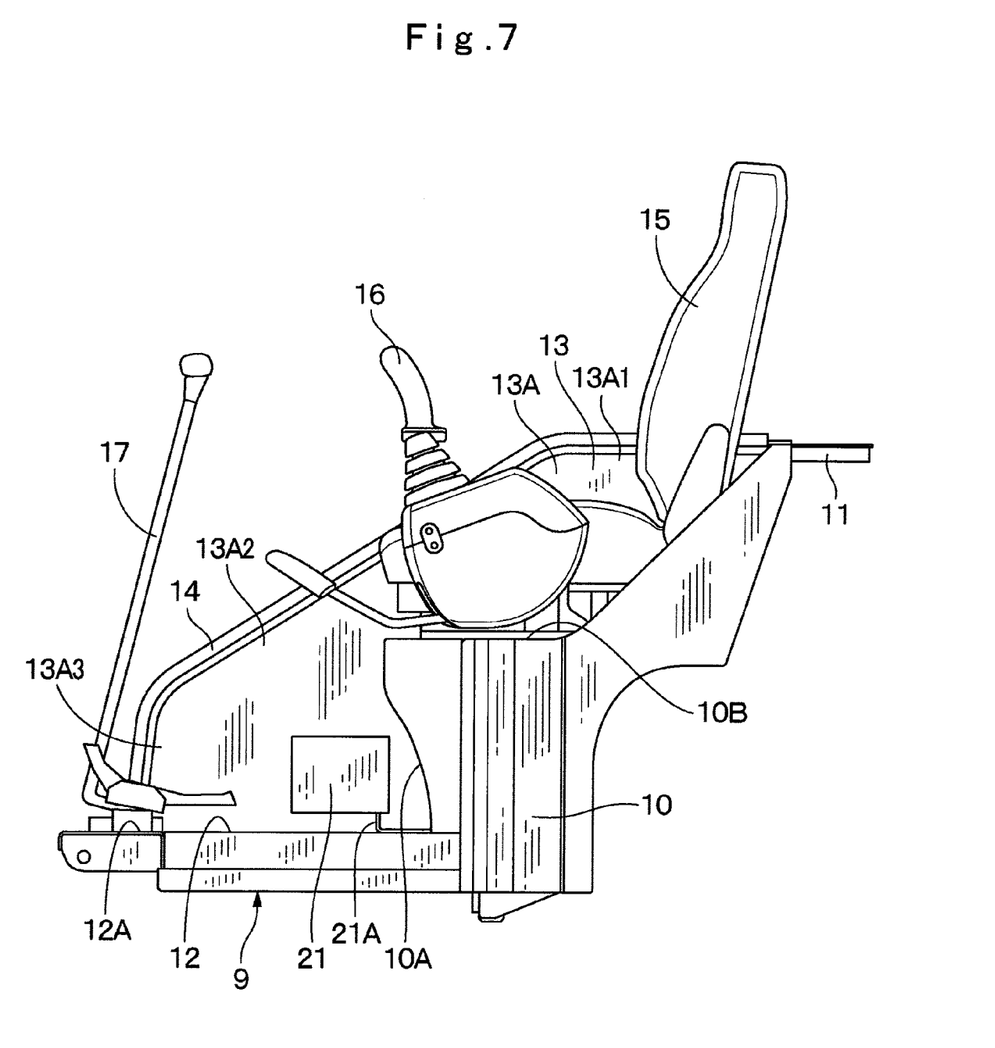
FIG. 7 is a front view of a state in which the operator's seat, the control levers, a control lever/pedal, the electrical component accommodating case, and the like are assembled to the floor member, and the air conditioning duct is removed.
Figure 8:
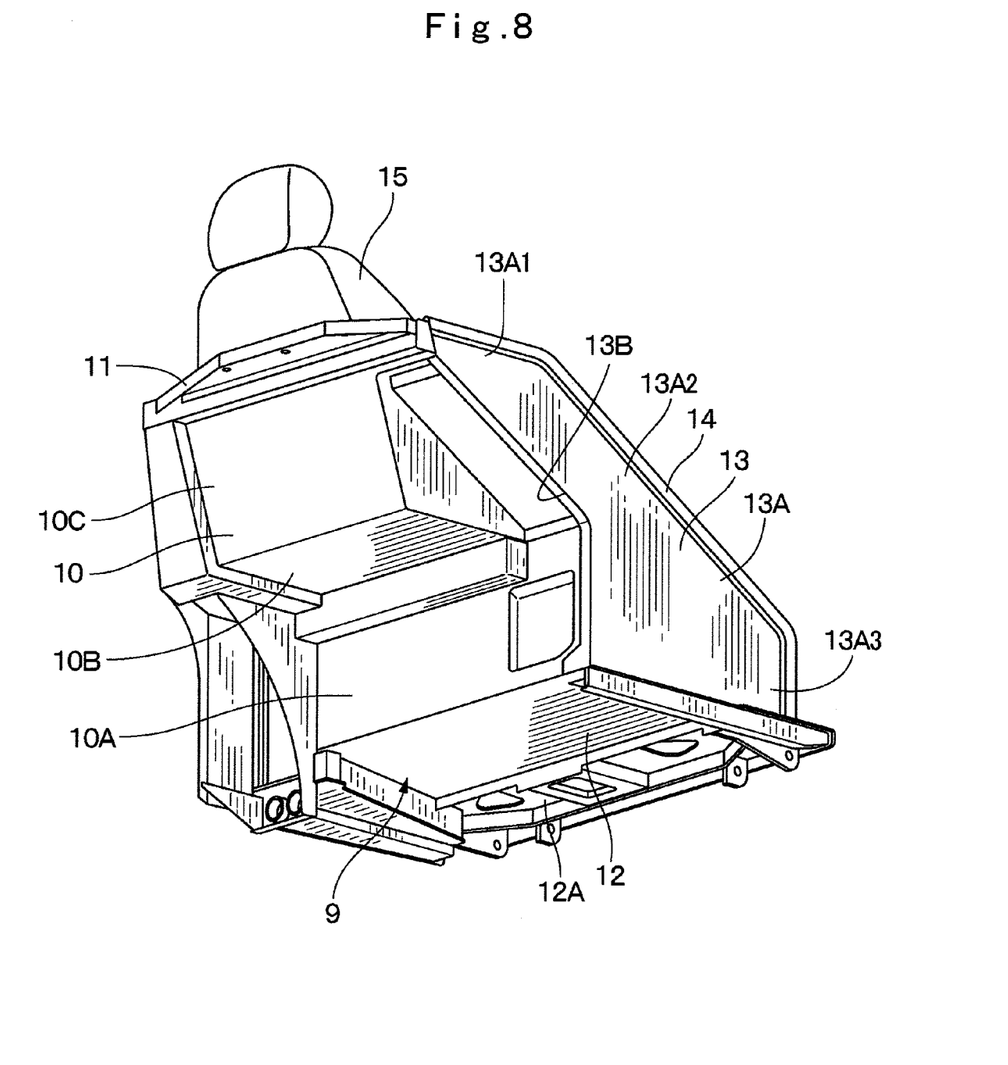
FIG. 8 is an external perspective view, taken from the right rear lower side, of the floor member.

Designated at 9 is the floor member constituting a bottom portion of the cab 8, and the floor member 9 is for the operator to get on. This floor member 9 at its front side position is supported at the front side position of the revolving frame 5 so as to be tiltable in the vertical direction, and the floor member 9 at its rear side position is provided so as to be capable of being mounted on and dismounted from the counterweight 6. As shown in FIGS. 6 to 8, the floor member 9 is constituted by a seat support platform 10 on which the below-described operator's seat 15 is mounted by being located on the rear side, the floor fixing portion 11 extending rearwardly from a rear portion of the seat support platform 10, a footrest area 12 for the operator to rest his feet thereon and located on the front side of the seat support platform 10, and the below-described right reinforcing panel 13.

Here, as shown in FIGS. 6 and 7, the seat support platform 10 has a riser panel 10A rising from a rear portion of the footrest area 12, a seat mounting plate 10B extending in the rear side from an upper end of the riser panel 10A, and a rear plate 10C extending in the upper side from a rear portion of the seat mounting plate 10B. The below-described operator's seat 15 is mounted on the seat mounting plate 10B.

The floor fixing portion 11 is provided in such a manner as to extend rearwardly from an upper portion of the rear plate 10C of the seat support platform 10. This floor fixing portion 11 is bolted down through vibration isolation members (not shown) to an upper portion of the counterweight 6 constituting a supporting structural member on the revolving frame 5 side in a state of the floor member 9 (cab 8) being tilted down.

Meanwhile, the footrest area 12 is an area where the operator seated in the operator's seat 15 rests his legs, and is formed in a substantially flat rectangular shape, and the front side portion is formed as a lever/pedal mounting portion 12A. Here, the footrest area 12 is formed with a single layer or a plurality of layers in the vertical direction and, for example, in the case of a two-layered structure, namely, a double floor structure in the vertical direction, an indoor unit of an air conditioner can be accommodated on a lower-stage floor (neither are shown). Further, the footrest area 12 at its front side position is mounted to a front portion of the revolving frame 5 so as to be tiltable up and down and in a vibration isolating state, for example.

Designated at 13 is a right reinforcing panel provided as a part of the floor member 9 for reinforcing the right side position of the floor member 9. This right reinforcing panel 13 is provided in such a manner as to rise upwardly of the footrest area 12 from a right side end portion of the floor member 9 which is on the opposite side in the left and right directions to an entrance way 24 provided in a left rear side panel 22L of the below-described cab box 22. The right reinforcing panel 13 is provided in such a manner as to extend in the front and rear directions between a right front pillar 22B and a right rear pillar 22D of the cab box 22. Consequently, the right reinforcing panel 13 together with a right side panel 22M of the cab box 22 covers the right side of the below-described operator's seat 15. At this time, as shown in FIG. 7 and the like, the right reinforcing panel 13 covers a position lower than a heightwise intermediate portion of the operator's seat 15.

In this instance, the right reinforcing panel 13 extends from the floor fixing portion 11 located on the rear side toward a front portion of the footrest area 12 located on the front side, and its upper end side is formed as an inclined seal mounting portion 13A which is inclined downwardly toward the front side. This inclined seal mounting portion 13A is formed by a horizontal end 13A1 located on the rear side and extending in the substantially horizontal direction at substantially the same heightwise position as that of the floor fixing portion 11, an inclined end 13A2 which is inclined downwardly toward the front side from a front portion of the horizontal end 13A1 located midway in the front and rear directions of the seat support platform 10, and a vertical end 13A3 which is substantially vertical and extends downwardly from a front portion of the inclined end 13A2 at a front position of the footrest area 12.

A substantially L-shaped notched recess 13B is formed in a rear side lower portion of the right reinforcing panel 13 in conformity with the shape of the step of the seat support platform 10. This notched recess 13B is formed as a recess for avoiding interference with such as the engine 7 disposed below the seat support platform 10 or a heat exchanger and the like associated with the engine 7.

Meanwhile, the right reinforcing panel 13 is integrally secured to right end portions of the seat support platform 10, the floor fixing portion 11, and the footrest area 12, which are assembled in step form, by such securing means as welding. As the right reinforcing panel 13 is erected at the right end portions of the seat support platform 10, the floor fixing portion 11, and the footrest area 12, the overall configuration of the floor member 9 can be formed into a three-dimensional structure similar to a box structure. Consequently, it is possible to enhance the strength of the seat support platform 10, the footrest area 12, and the like at their right side positions, so that, as shown in FIG. 11, even if the floor member 9 is tilted up as a single unit, it is possible to suppress the deformation (such as torsion and distortion) of the seat support platform 10, the footrest area 12, and the like.

Figure 9:
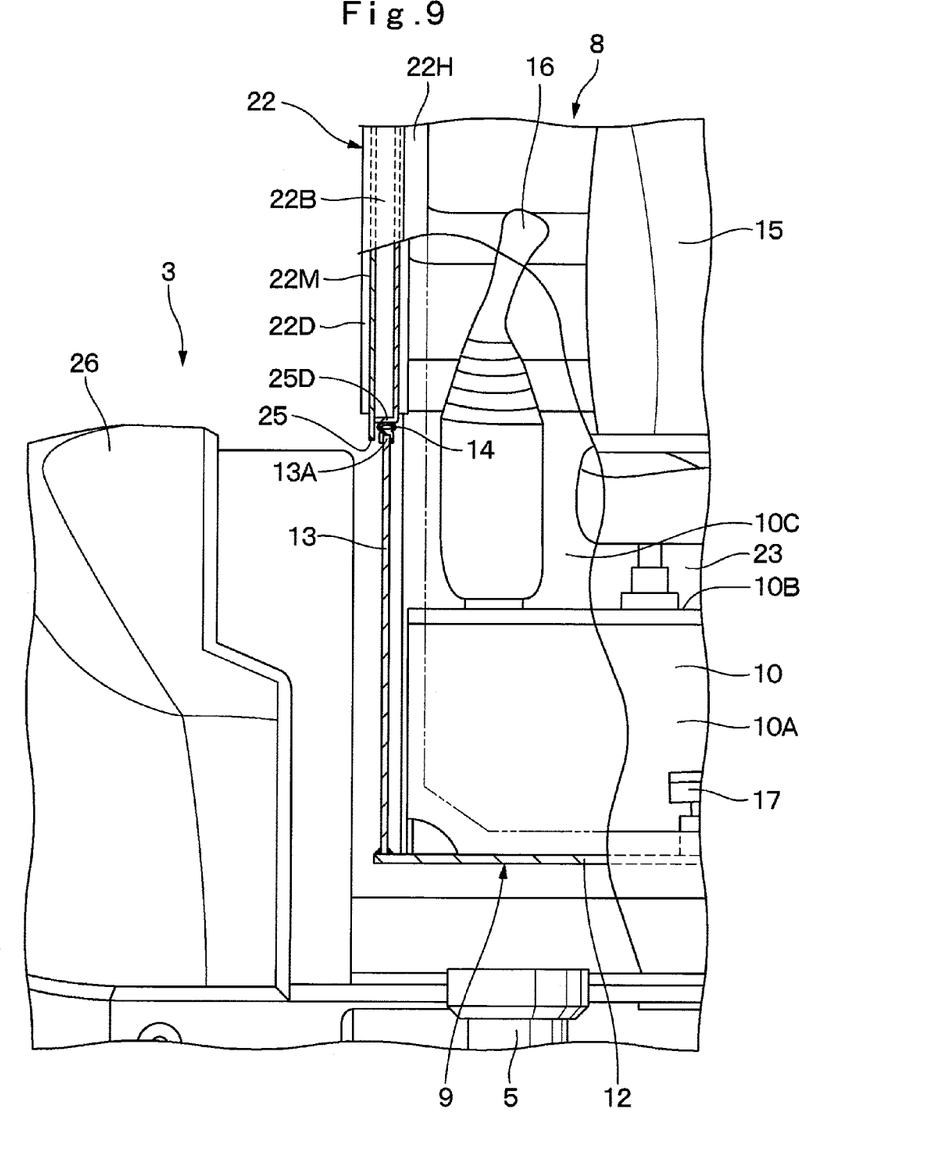
FIG. 9 is a left side view which is partly cut away, taken from the left side in FIG. 1, of an arrangement relationship between a right reinforcing panel of the floor member and a notched portion of the cab box.

Indicated at 14 is a seal member provided on an upper end side of the right reinforcing panel 13, and the seal member 14 is formed of an elastic seal called a weather strip, for example. The seal member 14 is mounted to the inclined seal mounting portion 13A located on the upper end side of the right reinforcing panel 13. As shown in FIG. 9, the seal member 14 abuts against a seal abutting portion 25D, which is provided at the notched portion 25 of the below-described cab box 22, in close contact therewith while undergoing elastic deformation, the seal member 14 is adapted to prevent the ingress of rainwater, dust, and the like into the operator's room 23.

Indicated at 15 is the operator's seat provided on the seat mounting plate 10B of the seat support platform 10, and the operator's seat 15 is for the operator to be seated therein. This operator's seat 15 is disposed in a substantially central portion in the left and right directions of, and close to the rear side of, the below-described operator's room 23 (interior of the cab 8). Moreover, two control levers 16 for operation are respectively provided on both left and right sides of the operator's seat 15, and a control lever/pedal 17 for traveling is provided on the lever/pedal mounting portion 12A of the footrest area 12 which is on the front side.

Indicated at 18 is an air conditioning duct (illustrated in FIG. 5) provided on the right side of the footrest area 12 for constituting the floor member 9. This air conditioning duct 18 is connected to air outlet ports of an indoor unit of the air conditioner (neither is shown), and is adapted to lead conditioned air from the indoor unit to the front side of the operator's room 23.

Indicated at 19 is a duct cover provided in such a manner as to cover the air conditioning duct 18 and the like, and the duct cover 19 has a plurality of air outlet ports 19A disposed at a corner between the footrest area 12 and the right reinforcing panel 13 to blow out the conditioned air supplied through the air conditioning duct 18. A monitor device 20 is mounted at a front side position of this duct cover 19 in such a way as to face the operator.

Denoted at 21 is the electrical component accommodating case provided on the interior side of the right reinforcing panel 13 of the floor member 9. Accommodated in this electrical component accommodating case 21 are electrical components for controlling the monitor device 20 and other equipment such as various power switches, volume controllers, display units, and the like (none are shown). The electrical components within the electrical component accommodating case 21 are connected to corresponding equipment through cables 21A.

Here, the electrical component accommodating case 21 is mounted to an inner surface of the right reinforcing panel 13 by making use of the space on the operator's room 23 side of the right reinforcing panel 13 by such as screwing down. In this case, since the right reinforcing panel 13 is integrally formed as a part of the floor member 9, even in cases where the below-described cab box 22 is dismounted from the floor member 9, the cables 21A in the electrical component accommodating case 21 located on the floor member 9 side need not be disconnected.

Next, designated at 22 is the cab box provided on the floor member 9, and the cab box 22 defines the below-described operator's room 23 over the floor member 9. This cab box 22 is mounted on the floor member 9 in such a manner as to surround the seat support platform 10 and the footrest area 12 of the floor member 9 and form a plane flush with the right reinforcing panel 13.

Figure 10:
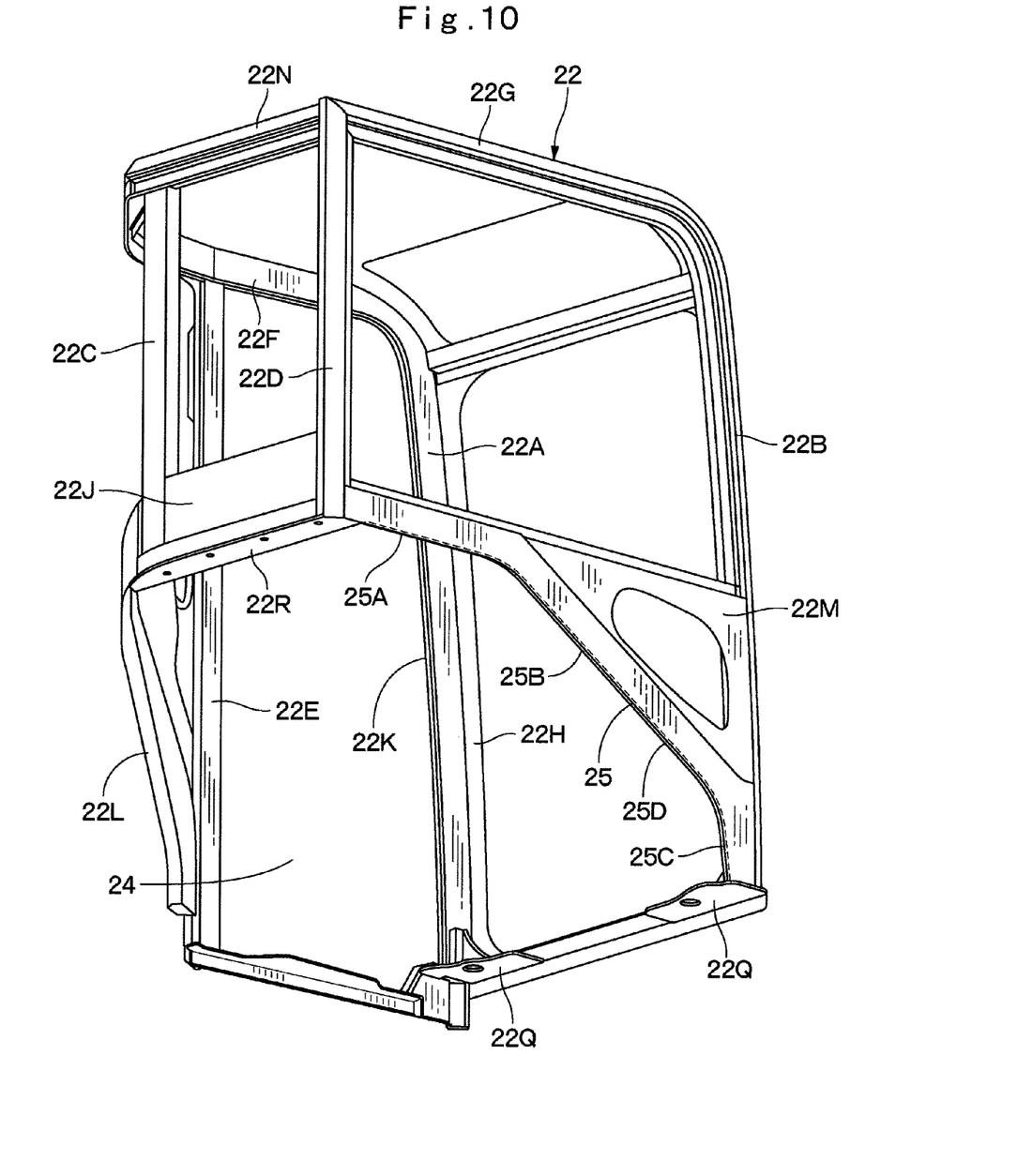
FIG. 10 is an external perspective view, taken from the right rear lower side, of the cab box as a single unit.

Here, as shown in FIG. 10, the framework of the cab box 22 is formed by a left front pillar 22A, the right front pillar 22B, a left rear pillar 22C, the right rear pillar 22D, a left center pillar 22E, a left roof pillar 22F, a right roof pillar 22G, and the like. Meanwhile, since the left rear pillar 22C and the right rear pillar 22D are erected on the upper side of the counterweight 6, the length of the left rear pillar 22C and the right rear pillar 22D is set to be approximately half the lengthwise dimension of the front pillars 22A and 22B, and the like. Further, the left rear pillar 22C is disposed in a range where it does not hamper the rearward field of view of the operator seated in the operator's seat 15, for example, at a rearward position of the operator's seat 15.

Figure 4:
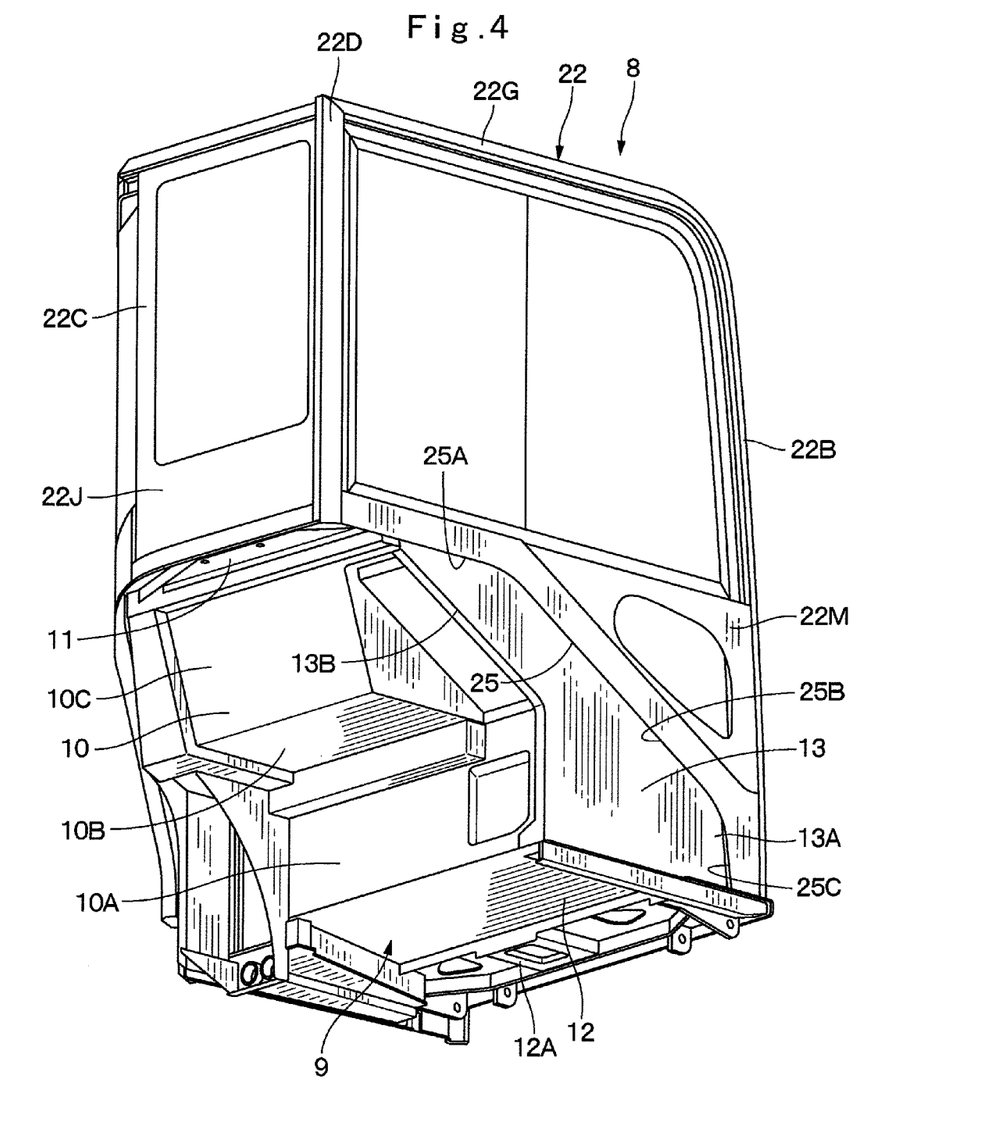
FIG. 4 is an external perspective view, taken from a right rear lower side, of a cab constituted by a floor member and a cab box.
Figure 5:
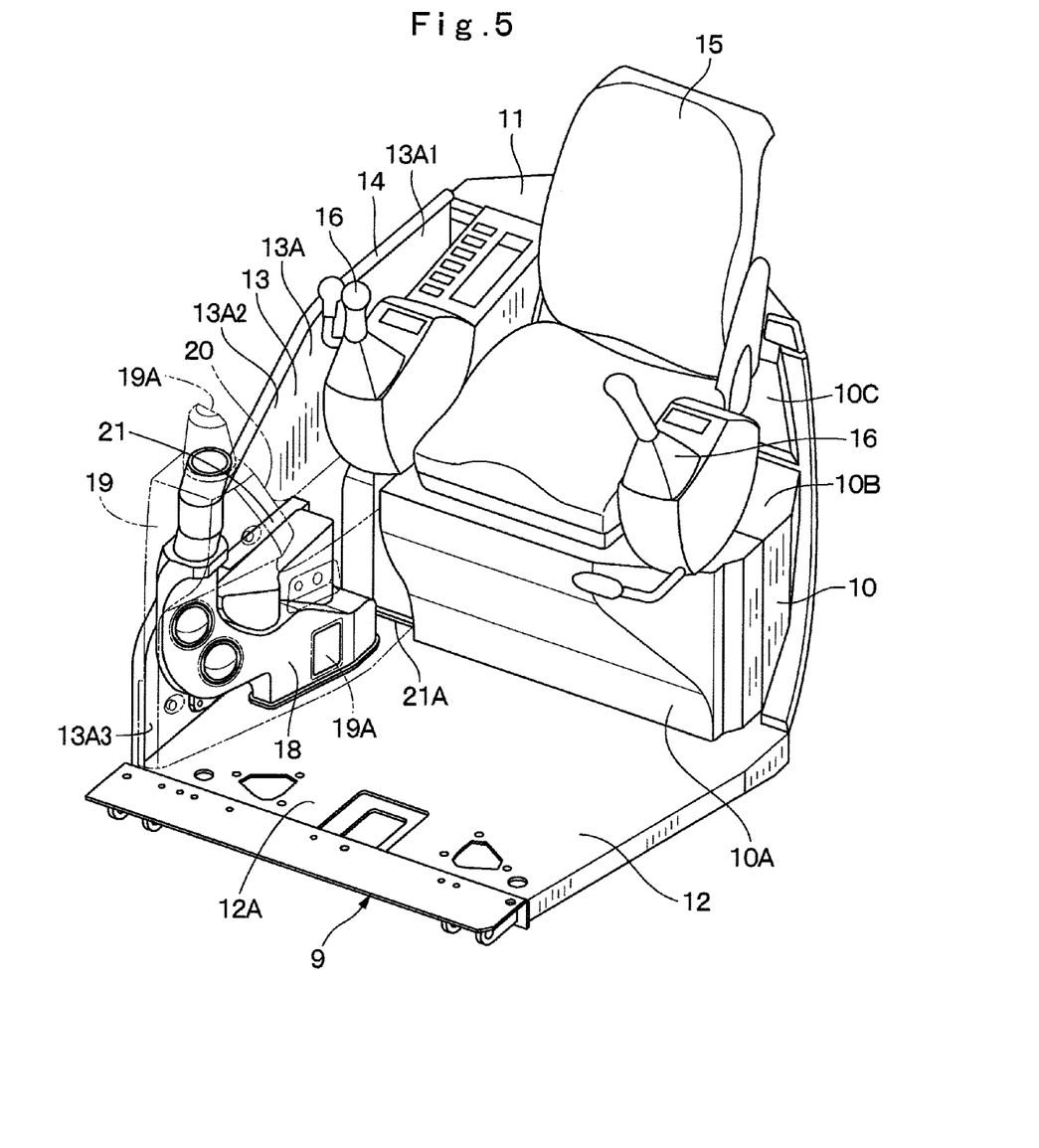
FIG. 5 is an external perspective view, taken from a left front upper side, of a state in which an operator's seat, control levers, an air conditioning duct, an electrical component accommodating case, and the like are assembled to the floor member.

A front panel 22H constituting the front side of the cab box 22 is formed between the left front pillar 22A and the right front pillar 22B, while a rear panel 22J constituting the rear side of the cab box 22 is formed between the left rear pillar 22C and the right rear pillar 22D. As shown in FIG. 2, a left front side panel 22K is formed between the left front pillar 22A and the left center pillar 22E, while the left rear side panel 22L in a circular arc shape is formed between the left center pillar 22E and the left rear pillar 22C. The left front side panel 22K and the left rear side panel 22L constitute the left side of the cab box 22. Meanwhile, as shown in FIGS. 4 and 9, the right side panel 22M constituting the right side of the cab box 22 is formed between the right front pillar 22B and the right rear pillar 22D. A top panel 22N constituting the top side of the cab box 22 is formed between the left roof pillar 22F and the right roof pillar 22G in such a manner as to continue from the front panel 22H. Thus, the pillars 22A to 22G are respectively disposed at corners between adjacent ones of the panels 22H to 22N. Further, a door 22P for opening and closing the below-described entrance way 24 is provided in the frame-shaped left front side panel 22K located between the left front pillar 22A and the left center pillar 22E.

Further, front side brackets 22Q are respectively provided at lower side positions of the left front pillar 22A and the right front pillar 22B, and a rear side bracket 22R is provided between a lower portion of the left rear pillar 22C and a lower portion of the right rear pillar 22D in such a manner as to extend in the left and right directions.

Accordingly, as each front side bracket 22Q is mounted to a front side position of the footrest area 12 of the floor member 9, and the rear side bracket 22R is mounted to the floor fixing portion 11, the cab box 22 is able to define the operator's room 23 serving as an occupying space for the operator over the floor member 9.

Indicated at 24 is the entrance way provided between the left front pillar 22A and the left center pillar 22E. This entrance way is opened when the door 22P is opened, and serves as a passage way for the operator to enter into or exit from the operator's room 23 over the floor member 9.

Denoted at 25 is the notched portion provided on the opposite side in the left and right directions of the entrance way 24, namely, on the right side panel 22M of the cab box 22. This notched portion 25 is for avoiding interference with the right reinforcing panel 13 of the floor member 9 when the cab box 22 is mounted on the floor member 9. Consequently, the notched portion 25 can be disposed substantially plane flush with the right reinforcing panel 13 so as not to overlap therewith.

Here, the notched portion 25 is formed in such a manner as to be inclined downwardly from the right rear pillar 22D toward the right front pillar 22B so as to correspond to the right reinforcing panel 13. In this case, the notched portion 25 is formed by a horizontal edge portion 25A located on the rear side opposing the horizontal end 13A1 of the right reinforcing panel 13 and extending substantially in the horizontal direction, an inclined edge portion 25B extending in such a manner as to be inclined downwardly from a front end of the horizontal edge portion 25A toward the front side so as to oppose the inclined end 13A2 of the right reinforcing panel 13, and a vertical edge portion 25C extending substantially vertically downwardly from a front end of the inclined edge portion 25B so as to oppose the vertical end 13A3 of the right reinforcing panel 13.

As shown in FIGS. 9 and 10, the notched portion 25 is provided with a seal abutting portion 25D against which the seal member 14 mounted on the right reinforcing panel 13 abuts. This seal abutting portion 25D is formed along the horizontal edge portion 25A, the inclined edge portion 25B, and the vertical edge portion 25C, and opposes the inclined seal mounting portion 13A of the right reinforcing panel 13. The seal abutting portion 25D is provided at a position slightly offset upwardly from the notched portion 25 so that a seam between the notched portion 25 and the right reinforcing panel 13 will not be seen from the outside.

It should be noted that indicated at 26 is an exterior cover (see FIGS. 3, 9, 11, and the like) provided over the revolving frame 5 by being located around the cab 8. This exterior cover 26 covers such equipment as the engine 7, the heat exchanger, a hydraulic oil tank, a fuel tank (both not shown) which are mounted on the revolving frame 5.

Indicated at 27 is a gas spring for urging the floor member 9 in the tilt-up direction (see FIG. 1). Here, the means for urging the floor member 9 in the tilt-up direction may be configured by, apart from the above-described gas spring 27, urging means such as a spring mechanism, a hydraulic cylinder, a coil spring, or the like.

The hydraulic excavator 1 in accordance with this embodiment has the above-described construction, and the operation in the case of mounting the operator's seat 15, the electrical component accommodating case 21, the cab box 22, and the like on the floor member 9 will be explained.

First, the floor member 9 serving as a base is prepared, the operator's seat 15 is mounted on the seat mounting plate 10B of the seat support platform 10, and the control levers 16 for operation are respectively disposed so as to be located on both sides in the left and right directions of this operator's seat 15. Further, the control lever/pedal 17 for traveling and the like are mounted on the lever/pedal mounting portion 12A located on the front side of the footrest area 12.

The electrical component accommodating case 21 in which electrical components for controlling electrical equipment are accommodated is mounted in the operator's room 23. At this time, since the electrical component accommodating case 21 is connected through the cables 21A to electrical equipment provided on the floor member 9, the electrical component accommodating case 21 cannot be mounted on the cab box 22 which is sometimes dismounted from the floor member 9.

Therefore, the electrical component accommodating case 21 is mounted on the right reinforcing panel 13 provided by being erected on the right side of the floor member 9. In this case, since the right reinforcing panel 13 is integrally provided as a part of the floor member 9, the electrical component accommodating case 21 can be mounted on the right reinforcing panel 13.

Next, after the respective equipment is mounted on the floor member 9, the cab box 22 is mounted on the floor member 9 so as to cover the operator's seat 15 and the like. For this reason, the front side brackets 22Q of the cab box 22 are mounted on the front side of the footrest area 12 of the floor member 9, and the rear side bracket 22R is mounted on the floor fixing portion 11. At this time, since the notched portion 25 is provided on the right side panel 22M of the cab box 22, the right reinforcing panel 13 which enters between the right front pillar 22B and the right rear pillar 22D can be shunted away by the notched portion 25, and the right reinforcing panel 13 and the notched portion 25 can be disposed on an identical plane. The floor member 9 on which the cab box 22 and the like are thus mounted can be installed on the revolving frame 5 together with the counterweight 6, the engine 7, and the like.

Next, the operation of the hydraulic excavator 1 in accordance with this embodiment will be explained. As the operator, after getting into the operator's room 23 and in a state of being seated in the operator's seat 15, operates the control lever/pedal 17 for traveling, it is possible to move the lower traveling structure 2 forward or backward. Meanwhile, by operating the control levers 16 for operation, it is possible to perform such as the operation of excavating earth and sand by tilting up and down the working mechanism 4.

As such, according to this embodiment, the arrangement provided is such that the right reinforcing panel 13 is provided at the right side position of the floor member 9 in such a manner as to rise upwardly of the footrest area 12, and the notched portion 25 for avoiding interference with the right reinforcing panel 13 is provided on the right side panel 22M of the cab box 22 which corresponds to this right reinforcing panel 13.

Accordingly, the floor member 9 can be formed three-dimensionally by plates extending in a plurality of directions by providing the right reinforcing panel 13, thereby making it possible to reinforce its right side position. Consequently, as shown in FIG. 11, even if the floor member 9 is tilted up with the cab box 22 dismounted, it is possible to suppress the floor member 9 from undergoing deformation such as torsion and distortion at this time.

As a result, the floor member 9 reinforced by the right reinforcing panel 13 makes it possible to reduce the number of locations for mounting structural members for reinforcement and the mounting location can be only one place where the right reinforcing panel 13 is mounted. Therefore, it is possible to reduce the number of component parts making up the floor member 9, thereby making it possible to attain low weight and low cost.

Moreover, since the right reinforcing panel 13 is extended and provided in the front and rear directions from the right front pillar 22B of the cab box 22 to the right rear pillar 22D, the right reinforcing panel 13 can be provided substantially over the entire length of the floor member 9. Consequently, it is possible to further enhance the strength of the floor member 9.

Since the right side panel 22M of the cab box 22 is provided with the notched portion 25 for avoiding interference with the right reinforcing panel 13, the right reinforcing panel 13 of the floor member 9 and the right side panel 22M of the cab box 22 can be disposed substantially on an identical plane so that they do not overlap with each other. In consequence, it is possible to suppress the right surface from becoming thick and thereby enlarge the operator's room 23, and the attractive feature in external appearance can be improved.

Meanwhile, as the right reinforcing panel 13 is provided in such a manner as to be erected at the right side position of the floor member 9, even in cases where the cab box 22 is dismounted from the floor member 9 to perform maintenance operation or the like, the right reinforcing panel 13 can be set in a state of being remained on the floor member 9 side. Consequently, since the right reinforcing panel 13 can be used for the mounting space on the floor member 9 side, the electrical component accommodating case 21 connected through the cables 21A to the electrical equipment provided on the floor member 9 can be mounted on the right reinforcing panel 13.

As a result, even in the narrow operator's room 23 as in the cab 8 of the small-sized hydraulic excavator 1, the electrical component accommodating case 21 can be mounted on the right side portion by making use of the right reinforcing panel 13. Consequently, the electrical component accommodating case 21 can be efficiently disposed without causing a hindrance to the maintenance operation of other equipment and without sacrificing the accommodation space. Since the right reinforcing panel 13 with the electrical component accommodating case 21 mounted thereon is a part of the floor member 9, the cab box 22 can be simply dismounted without heeding the cables 21A during the maintenance operation, thereby making it possible to improve the operational efficiency.

The right reinforcing panel 13 of the floor member 9 is provided with the seal member 14 by being located at the inclined seal mounting portion 13A opposing the notched portion 25 of the cab box 22, and the notched portion 25 of the right side panel 22M of the cab box 22 is provided with the seal abutting portion 25D against which the seal member 14 abuts. Accordingly, when the cab box 22 is mounted on the floor member 9, the seal member 14 can be elastically brought into tight contact state with the seal abutting portion 25D of the cab box 22. In consequence, it is possible to eliminate a clearance between the right reinforcing panel 13 of the floor member 9 and the right side panel 22M of the cab box 22 to thereby prevent the ingress of rainwater, dust, and the like, so that the working environment within the operator's room 23 can be improved.

Furthermore, since the right reinforcing panel 13 of the floor member 9 is provided in such a manner as to be inclined downwardly toward the front side, numerous windows or a large window can be provided in the right side panel 22M of the cab box 22, so that the forward field of view of the operator can be broadened in the left and right directions.

It should be noted that, in this embodiment, the case has been illustrated in which the right reinforcing panel 13 of the floor member 9 is arranged to be provided in such a manner as to extend in the front and rear directions between the right front pillar 22B and the right rear pillar 22D of the cab box 22. However, the present invention is not limited to the same, and a configuration may be adopted in which the right reinforcing panel 13 may be arranged to be provided, for example, between the riser panel 10A of the seat support platform 10 of the floor member 9 and the right front pillar 22B of the cab box 22. In this instance, the lengthwise dimension of the right reinforcing panel 13 becomes short.

In this embodiment, the case has been illustrated in which the right reinforcing panel 13 of the floor member 9 is arranged to be provided in such a manner as to be inclined downwardly toward the front side. However, the present invention is not limited to the same, and an upper end portion of the right reinforcing panel 13 may be formed, for instance, substantially horizontally, or may still alternatively be formed in a circular arc or other similar shape.

On the other hand, in this embodiment, the case has been illustrated in which the cab box 22 is formed in a pentagonal shape as a whole in a plan view by constructing the left side of the cab box 22 by the left front side panel 22K and the left rear side panel 22L. However, the present invention is not limited to the same, and the cab box may be formed in a quadrangular shape in a plan view by forming the left side into one rectilinear plane.

Further, in this embodiment, a description has been given by citing the hydraulic excavator 1 of cab specifications having the crawler type lower traveling structure 2 as an example of construction machines. However, the present invention is not limited to the same, and may be applied to a hydraulic excavator having, for example, a wheel type lower traveling structure.

DESCRIPTION OF REFERENCE NUMERALS

1: Hydraulic excavator (Construction machine)
2: Lower traveling structure
3: Upper revolving structure
4: Working mechanism
5: Revolving frame
7: Engine
8: Cab
9: Floor member
10: Seat support platform
11: Floor fixing portion
12: Footrest area
13: Right reinforcing panel
13A: Inclined seal mounting portion
14: Seal member
15: Operator's seat
21: Electrical component accommodating case (Electrical component)
22: Cab box
22A: Left front pillar
22B: Right front pillar
22C: Left rear pillar
22D: Right rear pillar
22E: Left center pillar
22F: Left roof pillar
22G: Right roof pillar
22H: Front panel (Front surface)
22J: Rear panel (Rear surface)
22K: Left front side panel (Left surface)
22L: Left rear side panel (Left surface)
22M: Right side panel (Right surface)
22N: Top panel (Top side)
22P: Door
23: Operator's room
24: Entrance way
25: Notched portion
25A: Horizontal edge portion
25B: Inclined edge portion
25C: Vertical edge portion
25D: Seal abutting portion

The invention claimed is:

1. A construction machine comprising:
an automotive lower traveling structure,
an upper revolving structure swingably mounted on said lower traveling structure,
a cab provided on a revolving frame which constitutes a supporting structure for said cab, and
a working mechanism liftably provided on a front side in front and rear directions of said upper revolving structure,
wherein said cab is formed by a floor member which has an operator's seat at a rear side thereof and whose front side serves as an operator's footrest area and by a cab box which is installed on said floor member, which cab box is formed by a front side, a rear side, a left side, a right side, and a top side to define an operator's room therein, and which cab box has an entrance way on said left side,
said cab being supported on said revolving frame so as to be tiltable in a vertical direction by using the front side of said floor member as a fulcrum, said construction machine characterized in that:
a right reinforcing panel is provided at a right side position in left and right directions of said floor member in such a manner as to rise upwardly of said footrest area so as to reinforce the right side position, and that a right side panel, which is located on the right side of said cab box, is provided having a notched portion to allow said right side panel to avoid interference with said right reinforcing panel.

2. The construction machine according to claim 1, wherein when said cab box is mounted on said floor member, and further wherein said notched portion of said right side panel of said cab box and said right reinforcing panel of said floor member are arranged to be disposed on an identical plane.

3. The construction machine according to claim 1, wherein said right side panel of said cab box is provided between a right front pillar and a right rear pillar of said cab box, and said right reinforcing panel of said floor member is provided as to extend, in the front and rear directions, between said right front pillar and said right rear pillar of said cab box.

4. The construction machine according to claim 1, wherein a seal mounting portion is located on an upper end side of said right reinforcing panel of said floor member and is provided with a seal member for preventing ingress of rainwater into said cab, and said right side panel of said cab box is provided with a seal abutting portion against which said seal member abuts at a position of said notched portion of said right side panel.

5. The construction machine according to claim 1, wherein an electrical component is mounted on an inner side of said right reinforcing panel of said floor member and is located in an interior of said operator's room of said cab box.

* * * * *